Figure 1:
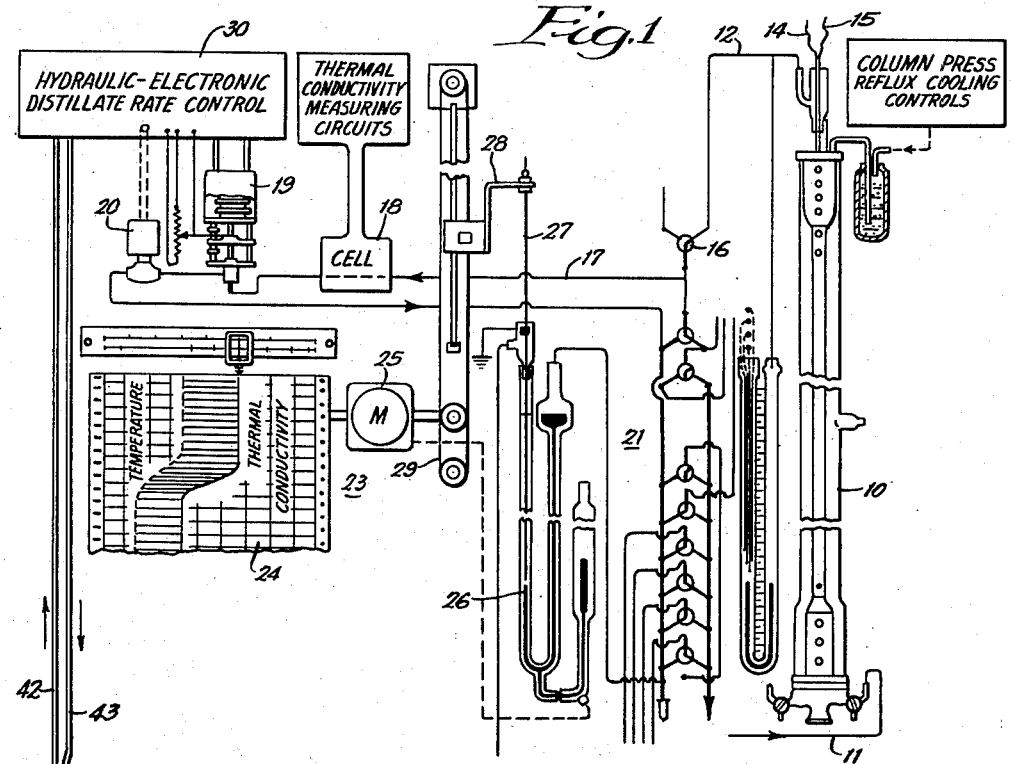

Jan. 24, 1961

S. T. PRESTON, JR
APPARATUS FOR CONTROLLING THE RATE OF
A DISTILLATION OPERATION 2,968,939

Filed July 20, 1955

3 Sheets-Sheet 1

INVENTOR.
Seaton T. Preston Jr.,
BY
Dawson, Tilton & Graham,
ATTORNEYS.

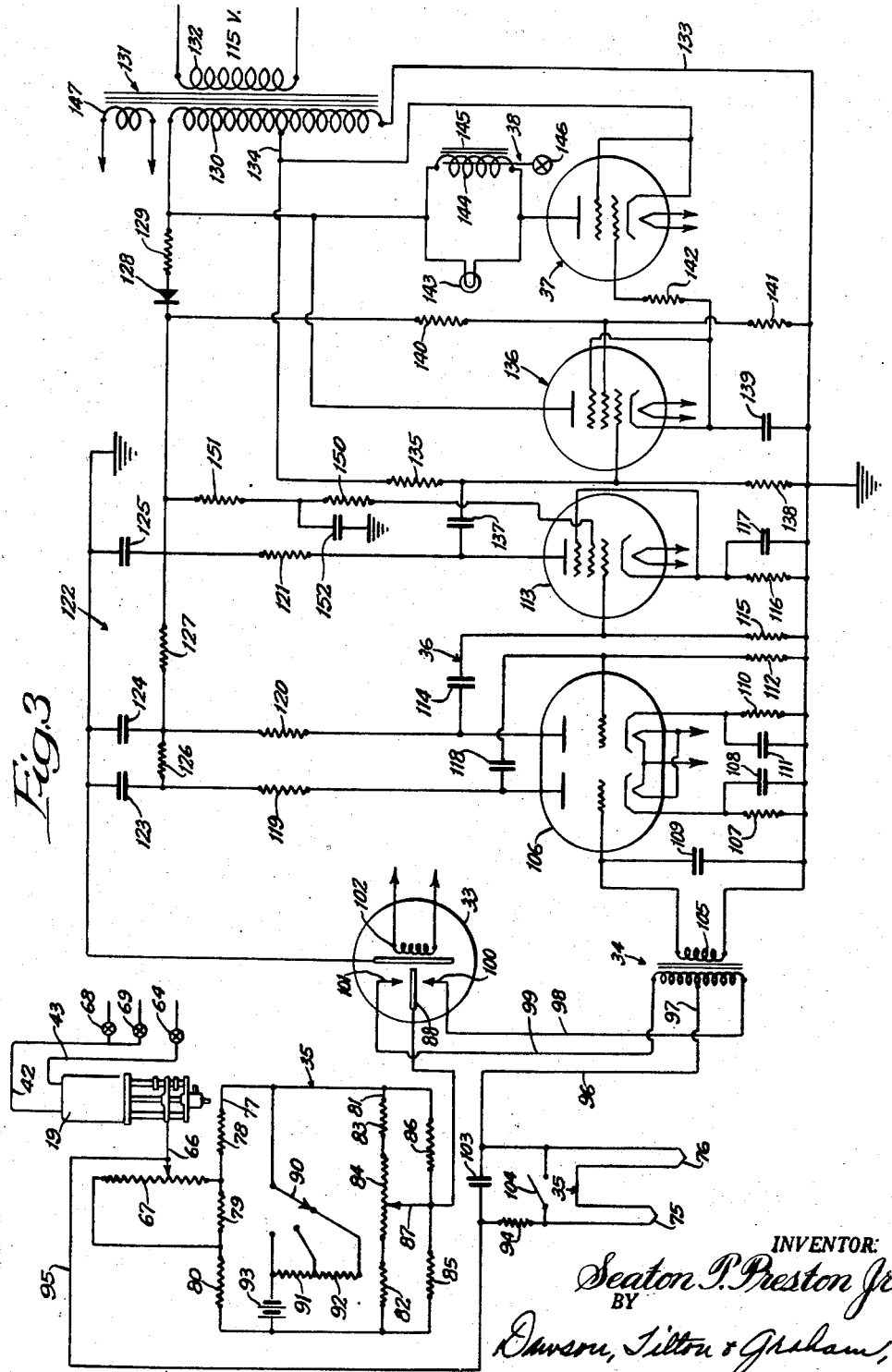

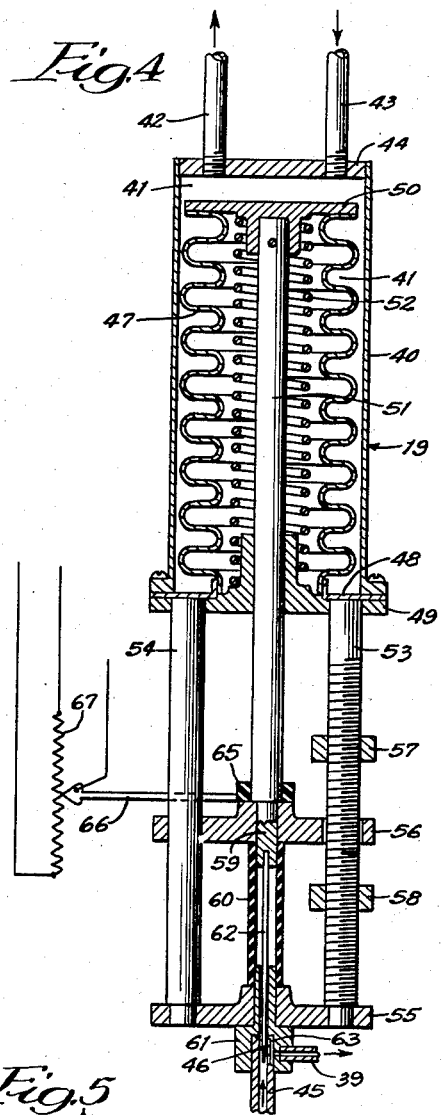
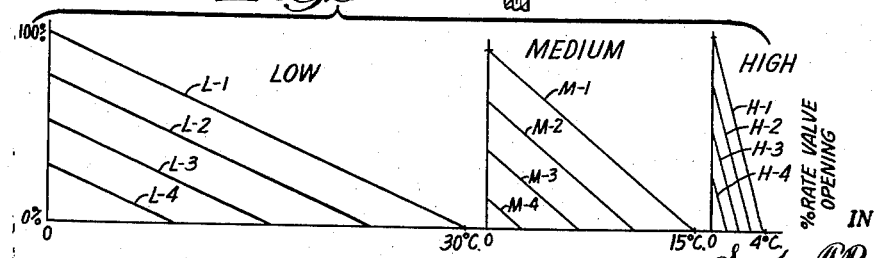

United States Patent Office 2,968,939
Patented Jan. 24, 1961

2,968,939
APPARATUS FOR CONTROLLING THE RATE OF A DISTILLATION OPERATION

Seaton T. Preston, Jr., Evanston, Ill., assignor, by direct and mesne assignments, to Walter J. Podbielniak Filed July 20, 1955, Ser. No. 523,162
2 Claims. (Cl. 73—25)

This invention relates to an apparatus for controlling the rate of a distillation operation, and more particularly the invention is concerned with apparatus for controlling the rate of flow of distillate from a fractionating column to vapor receivers. The invention is especially useful in connection with low temperature fractional distillation analysis apparatus of the type described in United States Patent No. 2,275,648.

This application is a continuation-in-part of my copending United States patent application, Serial No. 458,368 filed September 27, 1954 and now abandoned.

Fractional distillation analysis of gases to determine the identity of the components thereof and their relative percentages is a procedure that is widely used in several industries, and for example, the petroleum industry. The procedure usually followed involves the use of a thermocouple to follow the progress of the distillation operation, the thermocouple being located at the top of the fractionating column and being connected to an automatic recording potentiometer. In the automatic recordation, a recording pen is positioned by the potential difference generated by the thermocouple, and the potential difference is a measure of the distillate dew point or reflux temperature. The recording chart of the recording device is advanced in proportion to the volume of the distillate.

In following the progress of the distillation by the use of a thermocouple, it has been found necessary to prolong the distillation operations in order to attain a high degree of accuracy. This is due in part to the inability of a thermocouple to define the exact transition point between two successive components of a gas being distilled, unless the distillation rate is maintained at a very low value during the transition period. It is also due to the impracticality of operating at or near maximum separation rates due to the likelihood of the next lower boiling component being carried over as a contaminant in the distillate. Further, it has been necessary to use relatively large sample volumes in order to overcome certain other difficulties in the distillation analysis, and the length of time required to carry out a distillation operation increases in proportion to sample size.

As a result of the shortcomings inherent in the apparatus heretofore employed in the fractional analysis of gases, efforts have been made to improve the apparatus and one such effort involves the use of a thermal conductivity cell as the principal measuring instrument for following and recording the progress of a distillation operation. My copending application, Serial No. 458,368, now abandoned, describes apparatus for following the progress of a distillation operation using a thermal conductivity cell. The apparatus and system there disclosed is a marked improvement over the apparatus and systems heretofore in use, but it has been discovered that certain limitations are imposed by the use of a thermal conductivity cell as the sole measuring instrument.

It has now been found that if a thermal conductivity cell is used in conjunction with a thermocouple in apparatus for following the progress of a distillation operation, that marked advantages are realized over a system employing either a thermal conductivity cell or a thermocouple as the sole measuring instrument. The unique relationship between these measurements is fully developed and described in my copending United States patent application, Serial No. 523,183, entitled "Apparatus for Following the Progress of a Distillation Operation," now abandoned.

An object of this invention is to provide in apparatus for following the progress of a distillation operation employing both a thermocouple and a thermal conductivity cell as the measuring instruments, means for automatically regulating the distillate flow rate, which means cooperates in novel and advantageous ways with the measuring instruments. Another object of the invention is in greatly increasing the speed of a distillation operation by driving the fractionating column to its limit of separating rate at all times without sacrificing smoothness of operation.

Still another object is in accomplishing an increase in speed of a distillation cycle, while at the same time reducing sharply the time and attention of the analyst conducting the operation, while also relieving him of the responsibility and burden of setting and checking the maximum safe distillate rates, whereby the human element that may affect the accuracy of the results of the analysis is minimized. A further object is in the provision of a flow rate control valve and electronic means for operating the same that is responsive to transitions between components of a gas being analyzed to throttle down automatically and smoothly the distillate flow rate during transitions, but to otherwise permit a relatively high rate of distillate flow, and a smooth flow at all times. Additional objects and advantages will become apparent as the invention is developed in this specification.

An embodiment of the invention is illustrated in the accompanying drawings, in which—

Figure 2:
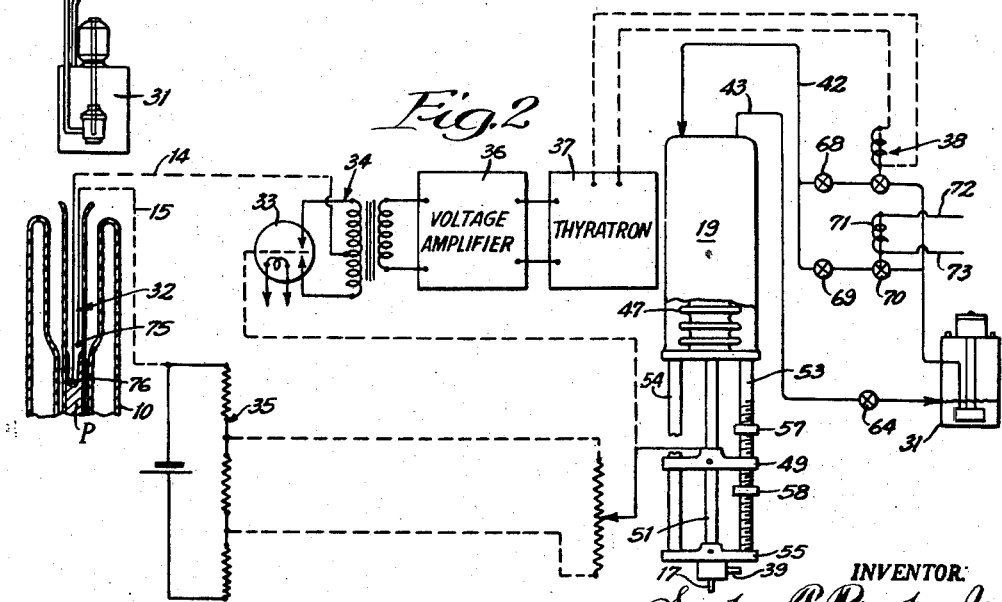

Figure 1 is a schematic diagram of distillation apparatus embodying the invention; Fig. 2 is a diagrammatic view showing the means for controlling the rate of a distillation operation; Fig. 3 is a schematic circuit diagram showing the control circuits; Fig. 4 is an enlarged vertical sectional view showing the distillate rate control valve; and Fig. 5 is a cart showing the percent of rate valve opening in the several conditions of sensitivity of the control circuit.

Fig. 1 illustrates the components of a distillation apparatus embodying the invention, and the particular apparatus there illustrated is adapted for low temperature fractional distillation analysis of gases over a temperature range from about minus 200° C. to plus 100° C. In the illustration of Fig. 1, certain of the components of the apparatus which are not germane to a description of the instant invention have been omitted for purposes of simplicity. However, the apparatus is illustrated in greater detail in my copending application, Serial No. 523,183, which is entitled "Apparatus for Following the Progress of a Distillation Operation," now abondoned, and reference may be made to that application if it is desired to have a more complete description and illustration of the apparatus.

A representation of a jacketed distillation column is shown in Fig. 1 and is designated with the numeral 10. The column 10 is adapted for use in the fractional distillation of gaseous samples introduced into the column through the feed line 11. Distillate from the column is removed through an overhead line 12. Within the top of the column there is positioned a differential thermocouple, the lead wires thereto being designated respectively with the numerals 14 and 15. The overhead line 12 is connected through a two-position valve 16 with a flow line 17 which provides a circuit through a thermal conductivity cell 18, an automatic rate valve 19 and a shut-off valve 20 to a distribution manifold designated generally by the numeral 21. By appropriate valve settings in the distribution manifold, the distillate vapor can be passed to selected receiving bottles (not shown). The two-position valve 16 is adapted to connect the flow line 17 with the column 10, or with an auxiliary column which has not been shown.

An automatic recording potentiometer is shown diagrammatically on the left side of Fig. 1, and is designated with the numeral 23. The recording chart 24 of that instrument is adapted to be driven forwardly by a motor 25 in response to the distillate volume. For this purpose, the chart drive of the recording potentiometer is arranged to synchronize the chart movement with the pressure rise in the distillate receiver. Whenever the mercury in the manometer 26 rises as a result of an increase in receiver pressure, contact is made with a rod 27 depending into the manometer and which is attached to a rack and pinion mechanism shown generally at 28, which in turn is coupled to the chart drive drum 29. This specific mechanism and its manner of operation are described in greater detail in United States Patent No. 2,275,648.

Also shown in Fig. 1 in block form designated with the numeral 30 is the electronic distillate rate control mechanism which is associated with a hydraulic pump 31. By referring to Fig. 2, it is seen that a differential thermocouple 32, having the lead wires 14 and 15 previously referred to, is positioned in the upper end of the column 10 and is connected to a D.C.-A.C. converter 33 and input transformer 34. Through the lead 15, the thermocouple is connected to a bridge network designated generally with the numeral 35. The input transformer 34 feeds into a voltage amplifier 36 that controls the triggering of a thyratron 37 having in the circuit thereof a solenoid control valve designated generally with the numeral 38. The control valve 38 is seen to be in circuit with the hydraulic pump 31 and with the distillate rate control valve 19. The arrangement is operative to automatically regulate the flow of distillate through the line 17, and into the line 39 which leads to the vapor receivers by adjustment of the valve 19 in accordance with temperature conditions in the column 10, as measured by the differential thermocouple 32.

It is believed that the invention will be more readily understood by first describing the specific construction of the distillate rate control valve 19 before describing the control circuits, and for that purpose reference will now be made in particular to Fig. 4. The valve 19 is seen to have an outer casing or jacket 40 that provides a compartment or chamber 41 therein that is liquid-tight. A hydraulic inlet line 42 communicates with the chamber 41 adjacent the upper end thereof and an outlet conduit 43 also is in open communication with the chamber at its upper end.

Mounted within the chamber 41 and extending longitudinally thereof is a bellows 47 that may be metallic and that is at its bottom end sealingly connected to a seal member 48 provided by the bottom wall 49 of the casing. At its upper end, the bellows 47 is sealingly connected to a plunger 50 having a plunger rod or shaft 51 pinned thereto and extending downwardly within the bellows 47 and slidably through the bottom wall 49 of the casing. A coil spring 52 is mounted within the bellows 47 coaxially with the rod 51, and seats at opposite ends respectively against the bottom wall 49 and plunger 50. The coil spring is operative to bias the plunger and rod upwardly relative to the casing and toward the top wall 44 thereof.

Rigidly secured to the bottom wall 49 and extending downwardly therefrom are a pair of parallel support standards 53 and 54 that, at their lower ends, are secured to a support plate 55. Slidably mounted upon the supports or guide rods 53 and 54 is a slide plate 56 that may have the upward and downward movement thereof determined respectively by the stops 57 and 58 that are threadedly received upon the guide standard 53 which is threaded to permit adjustment of the stops. The slide member 56 is rigidly secured to a reduced end portion 59 of the plunger rod 51.

The reduced end portion 59 of the rod extends downwardly through the slide 56 and is secured to the upper end of a flexible, stretchable sleeve 60 that may be made of rubber, natural or synthetic, or other suitable material that will permit up and down travel of the slide 56—the lower end of the sleeve 60 being sealingly secured to a reduced end portion of a valve casing 61 that is carried by and that extends upwardly through the plate 55. The elongated needle valve stem 62 at its upper end is rigidly secured to the plunger rod 51 at the reduced end portion thereof, and is slidably received within a passage provided in the valve casing 61. Preferably, the lower end of the needle valve stem 62 is tapered and enters a complementary valve seat 45 having a tapered lopped portion 46. Valve seat 45 at its lower end connects to infeed line 17.

The distillate rate control valve operates in the following manner: When a hydraulic fluid is pumped into the chamber 41 through the inlet 42, the plunger 50 is moved downwardly to carry the rod downwardly as well as the needle stem 62 which is carried thereby. Such movement of the valve stem 62 restricts the flow of distillate through the valve seat portion 46. On the other hand, when the infeed of hydraulic fluid is terminated, or at least reduced below the leakage rate from the chamber 41 as that rate is determined by a leak valve 64 (Figs. 2 and 3), the plunger is pushed upwardly by the spring 52 which raises the needle valve stem 62 and permits more distillate to flow from the conduit 17 to the conduit 39.

It is also seen in Fig. 4 that the plunger rod 51 adjacent the slide member 56 carries an insulation collar 65 having secured thereto a slide arm 66 that electrically engages at its outer end a slide wire resistor 67 that is connected in circuit with the bridge assembly 35, as will be described in detail hereinafter. Axial movement of the plunger rod 51 alters the position at which the slide arm 66 engages the resistance 67, thereby changing the potential supplied to the amplifier.

Referring back to Fig. 2, it is seen that the rate valve 19 and hydraulic pump 31 are connected by closed hydraulic circuit. The rate leak valve 64 is in the return line 43 from the valve 19 to the pump 31. The solenoid control valve 38, on the other hand, is in the pressure line 42 from the pump to the valve 19. If desired, a manually adjustable valve 63 may be arranged in series with the solenoid valve 38, and a pair of serially connected valves 69 and 70 may be connected in parallel with the valves 38 and 68. Most desirably, the valve 70 is a solenoid controlled valve, whereby the energizing coil 71 thereof is adapted to be connected through lines 72 and 73 to a source of power that is energized (open) whenever the column operating pressure falls below a desired level. In practice the distillation shut-off valve 20 is actuated in unison with solenoid valve 70.

In the apparatus described, the rate valve 19 is adjusted automatically to control the distillate flow rate in response to changes in temperature at the upper end of the distillation column that are caused by the transition from one component to another or by presence of an impurity due to an incomplete separation. This permits operation at the maximum possible rates for good separation, since impurities can rise in the column while being prevented from escaping in the overhead line.

These results are brought about by the control circuit shown schematically in Fig. 3, and reference will now be made to that figure in describing the circuit. First, however, attention may be directed to Fig. 2 in conjunction with Fig. 3, which shows that the differential thermocouple 32 may be formed of two separate thermocouples that are arranged so that one is positioned within the column 10 below the other. For purposes of identifying the thermocouples and their specific locations within the column, the upper thermocouple is designated with the numeral 75 and the lower with the numeral 76. The upper thermocouple 75 during a transition period is the colder of the thermocouples because it is still in intimate contact with the lower boiling component, while the lower thermocouple 76 is being contacted by the component having the next higher boiling temperature and is, then, at a higher temperature than the thermocouple 75. At other than transition periods, the thermocouples may be at the same temperature so that there is no current flow therebetween. However, when operating near maximum rates for sharp separation, the next lower boiling component will frequently rise as an impurity to the level of the lower thermocouple 76. This will create a small temperature difference between the two thermocouples, causing rate valve 19 to partially close, thereby reducing the distillate rate sufficiently to prevent the lower boiling component from escaping with the distillate at the top of the column. This is possible because lower thermocouple 76 is positioned at a distance below the top of the column packing P (Fig. 2), while the upper thermocouple 75 is just at the top of the packing. When the rate valve 19 is partially closed as just described, the flow rate is intentionally reduced somewhat more than is required to depress the impurity. Then, through the action of rate leak valve 64, valve 19 is gradually opened until a maximum open position is reached or until the lower boiling component is again forced upwardly to the level of lower thermocouple 76, giving rise to a repetition of the closing cycle just described.

The thermocouples are operatively arranged with a Wheatstone bridge 35 having a leg or branch 77 comprised of resistors 78, 79 and 80. The slide wire resistance 67 is in parallel with the resistor 79. The branch or leg 81 of the bridge is formed of the resistors 82 and 83 and a potentiometer 84 interposed therebetween. The resistor 82 and a portion of the potentiometer 84 is shunted by the fixed resistance 85, and the resistor 83 and the remaining portion of the potentiometer 84 is shunted by the fixed resistance 86. The center tap of the potentiometer is designated with the numeral 87 and is connected to the vibrator element 88 of the converter 33, which functions in the usual manner in the conversion of direct current to alternating current and may be, for example, a Brown converter.

The legs 77 and 81 of the bridge are connected together, and extending between the points of connection thereof is a manually adjustable switch 90 adapted to be connected so as to connect a resistor 91, the resistance 91 and a resistor 92 in series therewith, or to by-pass both of these resistances and connect directly to a D.C. source which may be a battery 93. The switch 90 and resistors 91 and 92 provide a sensitivity adjustment for the bridge circuit, and are used to selectively increase or decrease the degree of regulation provided by the rate valve 19 in accordance with the range between the boiling temperatures of successive components fractionated in the column 10. The potentiometer 84 is used to suppress the zero position or balance point on the slide wire.

The thermocouples 75 and 76 are connected in series, and the thermocouple 75 through a dampening resistance 94 is connected through line 95 to the slide arm 66 that is carried by the rate valve 19. The thermocouple 76 is connected through line 96 to the center tap 97 of the input transformer 34. The opposite sides of the primary winding of that transformer are connected through lines 98 and 99 respectively to the contacts 100 and 101 that are cyclically engaged by the vibrator element 88. The Brown converter 33 will have the customary winding 102.

A filtering, non-polarized capacitor 103 is connected between the thermocouples and it, along with the resistance 94, serve as dampening elements for the thermocouple circuit. Preferably, a switch 104 is provided in shunt across the thermocouples, and when closed electrically short circuits the output from the thermocouples so that the bridge may be balanced accurately.

One side of the secondary winding 105 of the input transformer 34 is connected to ground, while the other side thereof is connected to the grid of an electron discharge device 106 that, in the specific illustration given, is a duo-triode tube. Grid bias for the sections of the tube 106 is provided by the cathode resistor and capacitor 107 and 108 and the grid capacitor 109 in the first stage or section of the tube, and by the resistor and capacitor 110 and 111 in the cathode and the resistor 112 in the grid of the second stage of the tube. The capacitor 109 is an impedance-matching device.

The tube 106 and the associated circuits thereof comprise two stages of a high-gain, drift-free, three-stage amplifier. The pentode tube 113 forms the third stage, and the control grid thereof is fed from the second anode of the tube 106 through a coupling capacitor 114. Grid resistance 115 and cathode resistor and capacitor 116 and 117 bias the grid of the tube 113.

A capacitor 118 couples the first anode of tube 106 and second control grid of the tube 106. The anodes of the tube 106 and anode of the tube 113 each have a positive potential applied thereto respectively through the anode resistances 119, 120 and 121, each of which is connected to a filter array designated generally with the numeral 122, and which comprises filter capacitors 123, 124 and 125, one side of each being grounded, and the resistors 126 and 127.

The filter array 122 serves to provide a relatively smooth D.C. voltage that is fed thereto through a rectifier 128 that, in the illustration given, is a selenium rectifier. The rectifier 128 is connected through a resistance 129 to one side of the secondary winding 130 of a power transformer 131 having a primary 132 adapted to be connected to a source of A.C. power.

The other side of the primary winding 130 is connected to ground through line 133. The primary 130 has a center tap 134 that is connected through resistance 135 with the control grid of an electron discharge tube 136, the control grid of that tube also being coupled through capacitor 137 with the anode of the amplifier tube 113. The tube 136 is provided with a resistance 138 in the control grid circuit thereof, and with a capacitor 139 located in the cathode circuit thereof. The tube 136 and capacitor 139 form an A.C. voltage divider. The screen grid of the tube 136 is connected through a resistance 140 to the positive side of the rectifier 128 and through resistance 141 to ground.

As has been stated before, the tubes 106 and 113 form an untuned, high-gain, drift-free amplifier that feeds into the voltage divider tube 136 that serves to shift the phase of the signals and triggers the thyratron tube 37. The grid of the thyratron is connected to the cathode of the tube 136 through resistance 142. The screen grid of the thyratron is connected directly to its cathode, and both of these elements are connected to the center tap 134 of the secondary winding of the power transformer 131. An anode of the thyratron is connected to one side of the primary 130 through an indicator light 143 and energizing coil 144 in parallel therewith, which forms the energizing portion of the solenoid 145 having a plunger connected with a valve 146, the solenoid and valve forming the solenoid control valve structure described before and which has been designated generally with the numeral 38. The solenoid control valve 38 is arranged in the anode circuit of the thyratron so that the winding 144 is energized when the thyratron is fired to move the valve 146 toward its most open position. The flow of anode current in the thyratron will be indicated by the glow of the light 143.

The power transformer 131 has a low voltage secondary winding 147 that is adapted to be connected to the winding 102 of the Brown converter and also to the filaments of each of the electron discharge tubes.

*Operation*

In operation of the apparatus, the sensitivity selector switch 90 is turned to the desired sensitivity range, the switch 104 may be closed to short out the thermocouples and the potentiometer 87 adjusted to balance the bridge 35 at any desired position of the rate control valve 19. Then the switch 104 may be opened and a fractional distillation operation commenced.

As one component of a gas under analysis is boiled off, both portions of the differential thermocouple will be at the same temperature and no current will be flowing therethrough. Except for the reasons hereafter explained, no signals are fed to the amplifier and the thyratron is not triggered. Therefore, the solenoid control valve 38 remains in its predetermined open position. This condition is maintained and the distillate from the column 10 flows in relatively large volume through the thermal conductivity cell 18.

However, at a transition bewteen components, the lowermost thermocouple 76 is heated by the next higher boiling component, while the thermocouple 75 is maintained at its same temperature because it is still enveloped by the prior boiling component. The temperature difference causes a current flow through the differential thermocouple which unbalances the bridge 35. The D.C. current flow is converted into an A.C. pulse by the converter 33, whereby the input transformer 34 is energized and a signal is fed to the amplifier 106 and is amplified in the various amplifier stages, the phase of the output therefrom shifted in the tube 136 and the thyratron 37 is then triggered.

Anode current in the thyratron energizes the solenoid winding 144, and that condition is indicated by the light 143 which is energized at the same time. The valve 146 is then moved toward open position, and a greater volume of hydraulic fluid is then pumped by the pump 31 into the rate valve 19. The needle valve 62 of the rate valve is then moved toward closed position to throttle the flow of distillate from the column 10 to the vapor receivers. The thyratron 37 will continue to fire and the rate valve 19 will continue to further throttle the flow of distillate until the slide arm 66 has been moved downwardly along the slide wire 67 to effectuate a condition of balance in the bridge 35. When the bridge is again in balance, the thyratron will no longer be energized and that condition of balance will be maintained until a change in the condition of the thermocouples 75 and 76 occurs. When current flow therethrough terminates, the rate valve 19 will automatically open to the initial position—or stated in another way, until the arm 66 has moved along the wire 67 to a point where the bridge 35 is again in balance. The thermocouples will not provide a current flow when the temperature of each is the same.

In Fig. 4, stop members 57 and 58 are shown which provide mechanical limits for movement of the rate valve toward open and closed positions. Ordinarily, the stop 57 is not used for, as will now be described, I provide means for electrically limiting the extent of opening of the rate valve. However, the lower stop 58 may be employed for limiting the extent of closing or throttling that is provided by the rate valve during transition periods.

As is seen most clearly in Fig. 2, the valve 64 is interposed in the return line of the pump 31 from the rate valve 19. The valve 64 is a rate leak valve that may be adjusted to determine the rate at which hydraulic fluid is expelled from the chamber 41 of the rate valve under the biasing action of the spring 52. Since the spring 52 urges the plunger 50 upwardly, it is apparent that hydraulic fluid within the chamber 41 will be forced outwardly therefrom, through the return conduit 43 and leak valve 64 thereof and to the pump 31. The electric stop valve operates to hold the rate valve at any open position, even though the spring 52 tends to expel hydraulic fluid therefrom.

When the plunger tends to move upwardly, the slide arm 66 tends to move upwardly, and the slightest movement thereof unbalances the bridge 35 whereby a signal is fed through the converter 33 to the input transformer 34. The signal is amplified and triggers the thyratron wherein the solenoid control valve 38 opens to permit more fluid to be pumped into the rate valve chamber 41. This surge of hydraulic fluid then tends to return the rate valve to its pre-set open position. When the bridge is in balance, the indicator light 143 flashes on and off cyclically at a relatively uniform rate which indicates that the control circuit is functioning to maintain the rate valve at its pre-set open position, as determined by the position of potentiometer 84.

The components in different gas samples may have boiling temperatures that are relatively close together or that may be quite far apart. For this reason, it is desired to provide selection of the sensitivity of the bridge so that greater response of the rate valve is brought about when the boiling temperatures of two components are close together. Fig. 5 shows in graph form the three ranges of sensitivity that are afforded by the selector switch 90. It is seen in Fig. 5 that at the lowest sensitivity, a temperature difference of 30° C. will effect complete closing of the valve when operating, on line L–1. The medium sensitivity scale, on the other hand, provides a comparable maximum rate valve closing for a temperature differential of 15° C. The greatest sensitivity results in about 100% closing of the rate valve by a temperature change of 4° C. The various operating lines L–1 to L–4, M–1 to M–4, and H–1 to H–4 represent typical responses over the range of maximum distillate rates as determined by the setting of potentiometer 84.

In the position of the selector switch as shown in Fig. 3, the bridge has maximum sensitivity and in this condition both of the resistors 91 and 92 are in series with the battery 93. Medium sensitivity results when only the resistor 91 is in series with the battery, and minimum sensitivity when the resistors 91 and 92 are by-passed. The sensitivity of the control circuit is quite great, and it functions at about the threshold of the noise level, or at about eight microvolts.

The specific arrangement that has been described results in the rate valve 19 anticipating the transition from one component to a successive component of higher boiling point in a distillation operation. That is, the rate valve is responsive to the differential thermocouple which is located in the upper end of the distillation column. Therefore, the distillate flow rate has been slowed down to the desired value before the distillate flow of the transition stage reaches the thermal conductivity cell. As a result, the proper flow rate to afford accuracy in the measurements obtained by the cell 18 is provided at the initiation of the transition flow period. Therefore, smaller samples may be used, which results in an increase in the speed of distillation operations, and further increases in the speed of operation are afforded because the flow rates may be maximized during periods between transitions.

While in the foregoing specification an embodiment of the invention has been illustrated and described in great detail for purposes of making a full disclosure of the invention, it will be appreciated that the invention is capable of other embodiments, and variations may be made in the numerous details set forth without departing from the spirit and principles of the invention.

I claim:
1. In distillation apparatus, a distillation column equipped with packing, a distillate flow line communicating with said column above the upper level of said packing, reflux means in said column above said packing upper level, a rate control valve in said distillate flow line, a differential thermocouple having one junction below said packing upper level and the other junction at said packing upper level, and electro-mechanical means coupling said valve and thermocouple for controlling said valve as a function of the temperature differential between the thermocouple junctions, the temperature differential being indicative of the concentration gradient in the upper section of the column packing and between the junctions.

2. In distillation apparatus, a distillation column equipped with packing, a distillate flow line communicating with said column above the upper level of said packing, reflux means in said column above said packing upper level, a rate control valve in said distillate flow line, a differential thermocouple having a pair of junctions, one junction positioned below said packing upper level and the other junction at said upper packing level, and means coupling said valve and thermocouple for controlling said valve as a direct function of the temperature differential between the thermocouple junctions, the temperature differential being indicative of the concentration gradient in the upper section of the column packing in between the junctions.

References Cited in the file of this patent

UNITED STATES PATENTS

| | | |
|---|---|---|
| 2,022,809 | Kramer | Dec. 3, 1935 |
| 2,054,120 | De Florez | Sept. 15, 1936 |
| 2,275,648 | Podbielniak | Mar. 10, 1942 |
| 2,398,818 | Turner | Apr. 23, 1946 |
| 2,429,555 | Langford et al. | Oct. 21, 1947 |
| 2,563,931 | Harrison | Aug. 14, 1951 |
| 2,616,296 | Wannamaker | Nov. 4, 1952 |
| 2,675,510 | Belcher | Apr. 13, 1954 |

OTHER REFERENCES

Brown Instrument Bulletin—No. 15-6—"Operating Principles of Brown Electronik Potentiometer Pyrometer," 1943.